UNITED STATES PATENT OFFICE.

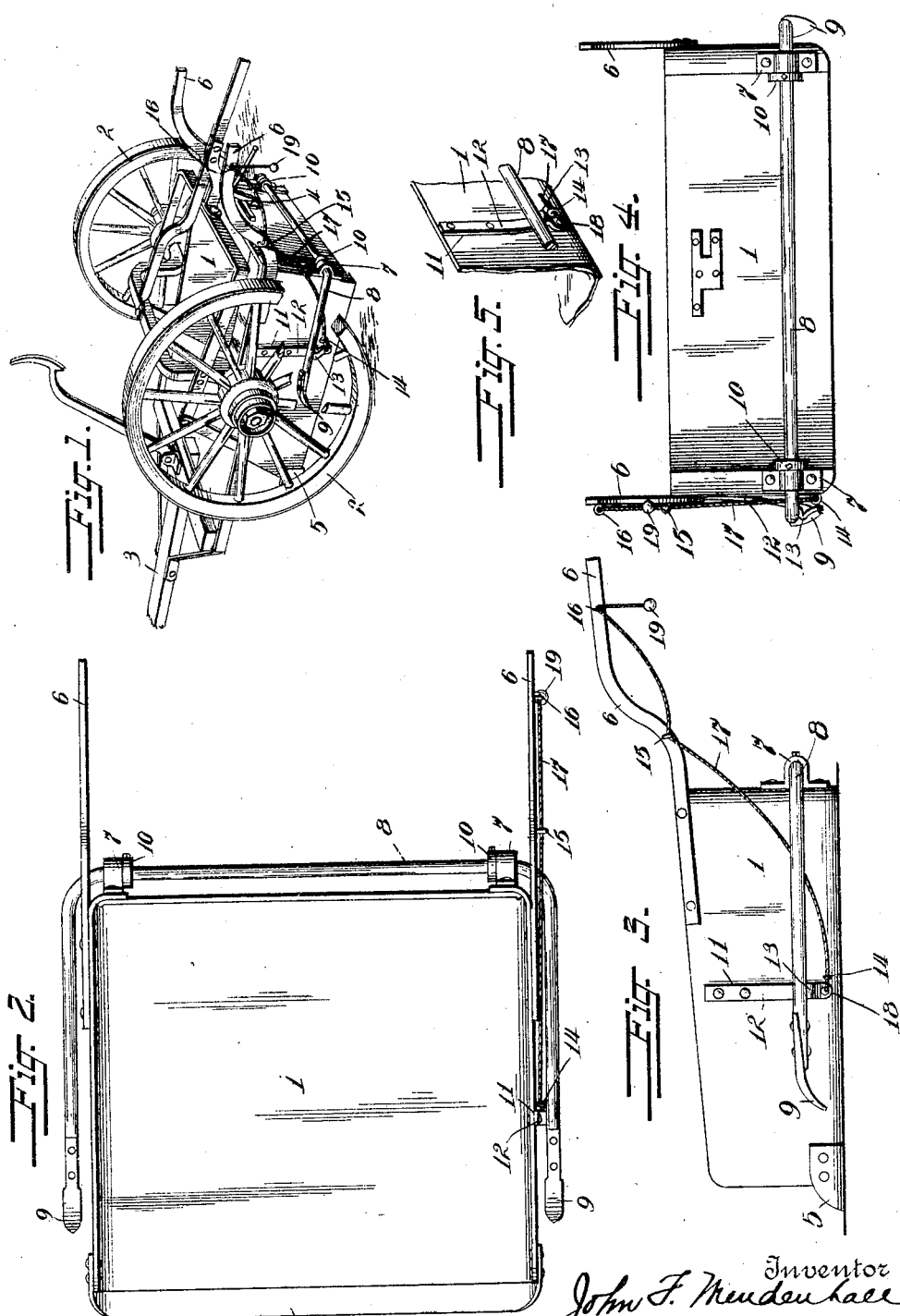

JOHN F. MENDENHALL, OF SPRINGVILLE, UTAH.

SELF-DUMPING SCRAPER.

No. 810,165.　　　　Specification of Letters Patent.　　　　Patented Jan. 16, 1906.

Application filed November 8, 1905. Serial No. 286,333.

*To all whom it may concern:*

Be it known that I, JOHN F. MENDENHALL, a citizen of the United States, residing at Springville, county of Utah, and State of Utah, have invented certain new and useful Improvements in Self-Dumping Scrapers, of which the following is a specification.

This invention relates to self-dumping scrapers.

The object of the present invention is the provision of simple, strong, and inexpensive mechanism adapted for application to ordinary wheeled and sliding surface scrapers which will be adapted to automatically dump the scraper-pan of its contents without exertion on the part of the operator; and to this end the invention embodies a hinged dump-bar positioned and operating in a novel manner, together with a novel arrangement of locking mechanism for the dump-bar to normally hold it in raised position, and releasing mechanism arranged and coöperating with the locking mechanism in an improved fashion, all as set forth hereinafter.

In the accompanying drawings, Figure 1 is a perspective view showing the invention applied to a well-known type of wheeled scraper. Fig. 2 is a plan of only the pan and parts especially pertaining to my invention. Fig. 3 is a side elevation of Fig. 2. Fig. 4 is a rear elevation of Fig. 2, and Fig. 5 is a detail of the locking mechanism, showing how it coöperates with the dump-bar.

The scraper pan or scoop 1, wheels 2, drag-yoke 3, and locking mechanism 4 are all of ordinary or any preferred construction. A shoe 5 may be used, if desired. The handles 6 extend rearwardly from the pan and are adapted to be grasped by the operator in the usual fashion.

Secured by bolts or rivets to the back of the pan 1 are journal-eyepieces 7, and in these journal-eyepieces is mounted to freely turn a U-shaped dump-bar 8, having secured to its respective forwardly-projecting ends points or shoes 9, which curve downwardly and are adapted to engage the ground when the dump-bar is allowed to drop. To prevent sidewise movement of the dump-bar, it is provided with adjustable collars 10.

Secured at 11 to the side of the pan 1 is a spring-latch 12, which extends in a general up-and-down direction and is free to spring inwardly and outwardly in relation to the side of the pan, said latch having an offset or bent latching-head 13 at its lower end, which is adapted to sustain the dump-bar in general horizontal position and also to permit the latch-bar to easily snap past the head and engage itself therewith after the dumping operation, as will presently appear.

Fastened to the side of the pan is an eye 14. Eyes 15 and 16 are secured at suitable points on one of the handles 6. A cord 17 runs freely through the eyes 14 15 16 and is connected to the inner face of the latching-head 13 at 18, so that upon exerting a pull on the cord 17 the latch 12 will be pulled toward the side of pan 1 against its tendency to spring outwardly, and thus the dump-bar will be released. The free end of the cord 17 may be provided with a knot or handle 19.

The operation is as follows: When it is desired to dump the load of dirt in the scraper-pan 1, the operator pulls cord 17, which draws the spring-latch 12 toward the side of the pan and releases the latching-head 13 from the dump-bar 8, which thereupon falls by gravity on account of the leverage of the forwardly-extending portions thereof, bringing the points or shoes 9 into engagement with the ground, the dump-bar turning in the journal-eyes 7. As the scraper-pan is pulled forward by the horses or other motive power the back of the pan is raised to such a height that the shoe 5 or front edge of the pan catches the ground, and the pan is turned thereby to a position slightly forward of the perpendicular, whereby the dirt in the pan is dumped without exertion on the part of the operator. While the pan is being turned as aforesaid, the motion thereof, together with the force of gravity, causes the dump-bar 8 to swing into place and to snap past the latching-head 13 and reengage with the latch 12 to thereby catch itself in position for a repetition of the operation after the pan has been returned to normal position and another load scraped and ready to dump.

Having thus described my invention, what I claim as new, and desire to secure by Letters Patent, is—

1. In a self-dumping scraper, the combination with a scraper-pan or scoop, of a dump-bar having a portion journaled to the pan and substantially straight arms extending forwardly at the sides of the pan which are provided with free ends to engage the ground, and a latch adapted to engage the dump-bar to hold the forwardly-extending arms raised and in substantially horizontal position, together with means for releasing said latch.

2. In a self-dumping scraper, the combination with a scraper-pan or scoop, of a dump-bar of substantial U shape having a cross-piece journaled to the back of the scraper-pan or scoop and substantially straight arms extending forwardly at the sides of the pan or scoop which are provided with free ends to engage the ground, a latch on the side of the pan or scoop adapted to engage one of said arms and hold the forwardly-extending arms raised and in substantially horizontal position, and means for releasing said latch.

3. In a self-dumping scraper, the combination with a scraper-pan or scoop, of a dump-bar having a portion journaled to the pan and arms extending forwardly at the sides of the pan which are provided with free ends to engage the ground, a spring latch-bar secured to the side of the pan and extending in a general up-and-down direction having a free portion provided with a latching-head adapted to engage and support the arm of the dump-bar, and means for releasing said latch-bar.

In testimony whereof I hereunto affix my signature in presence of two witnesses.

JOHN F. MENDENHALL.

Witnesses:
 B. W. MENDENHALL,
 ALFRED L. BOOTH.